United States Patent
Beghelli

(10) Patent No.: US 9,426,867 B2
(45) Date of Patent: Aug. 23, 2016

(54) LIGHTING APPARATUS WITH BRIGHTNESS SELF-ADJUSTMENT AND SELF-ADJUSTING METHOD THEREOF

(71) Applicant: BEGHELLI S.p.A., Monteveglio (IT)

(72) Inventor: Gian Pietro Beghelli, Monteveglio (IT)

(73) Assignee: BEGHELLI S.P.A. (IT)

( * ) Notice: Subject to any disclaimer, the term of this patent is extended or adjusted under 35 U.S.C. 154(b) by 0 days.

(21) Appl. No.: 14/441,370

(22) PCT Filed: Oct. 28, 2013

(86) PCT No.: PCT/IT2013/000299
§ 371 (c)(1),
(2) Date: May 7, 2015

(87) PCT Pub. No.: WO2014/073012
PCT Pub. Date: May 15, 2014

(65) Prior Publication Data
US 2015/0305118 A1    Oct. 22, 2015

(30) Foreign Application Priority Data
Nov. 8, 2012    (IT) ............... VI2012A0298

(51) Int. Cl.
| | |
|---|---|
| *H05B 41/392* | (2006.01) |
| *H05B 33/08* | (2006.01) |
| *G01R 35/00* | (2006.01) |
| *H05B 37/02* | (2006.01) |
| *H05B 39/04* | (2006.01) |

(52) U.S. Cl.
CPC ........ *H05B 37/0218* (2013.01); *H05B 33/0854* (2013.01); *H05B 39/042* (2013.01); *H05B 41/3922* (2013.01); *Y02B 20/46* (2013.01)

(58) Field of Classification Search
CPC ............... H05B 37/02; H05B 37/0227; H05B 37/0272; H05B 37/0218; H05B 41/40; H05B 41/3927; H05B 41/3922; H05B 39/042; G05D 25/02; H04N 1/4076; G07D 7/12
USPC ........... 315/290–295, 360, 51, 384, 158, 308; 345/82, 597; 382/135; 356/243.8, 356/243.1; 702/104
See application file for complete search history.

(56) References Cited

U.S. PATENT DOCUMENTS 5,889,883 A *   3/1999   Simpkins ............. H04N 1/4076
                                                   382/135
2006/0278808 A1   12/2006   Hick et al.
(Continued)

FOREIGN PATENT DOCUMENTS

| EP | 0563 696 A2 | 10/1993 | |
|---|---|---|---|
| JP | 2012043602 | *  3/2012 | ......... H05B 33/0842 |
| WO | WO 2012/059761 A1 | 5/2012 | |

OTHER PUBLICATIONS

Translation of Patent JP2012043602 (A), Sharp, Mar. 1, 2012.*
(Continued)

*Primary Examiner* — Alexander H Taningco
*Assistant Examiner* — Renan Luque
(74) *Attorney, Agent, or Firm* — Hershkovitz & Associates, PLLC; Abe Hershkovitz

(57) ABSTRACT

A lighting apparatus (10) with a brightness control or self-adjustment, comprising an electronic power supply (11) having a brightness self-tuning and a brightness set-point self-calibrator, a sensor (14) for measuring the environment brightness (16) and a control circuit for automatically adjusting the emitted light (18) on the basis of the environment light, so as to keep steady the light in the environment and automatically reduce the emitted light (18) when the environment natural light increases. A method for self-adjusting the environment light sensor (14) allows for obtaining a self-adjusting lighting system on the basis of the natural light in the environment.

6 Claims, 2 Drawing Sheets

(56) References Cited

U.S. PATENT DOCUMENTS

| | | | | |
|---|---|---|---|---|
| 2007/0185675 | A1* | 8/2007 | Papamichael | F21S 13/14 702/85 |
| 2010/0045191 | A1* | 2/2010 | Aendekerk | G05D 25/02 315/152 |
| 2010/0244706 | A1* | 9/2010 | Steiner | G01J 1/02 315/149 |

OTHER PUBLICATIONS

BPX 43—Silicon NPN Phototransistor, OSRAM Opto Semiconductor, p. 1, Jan. 14, 2014. Web. <http://www.osram-os.com/Graphics/XPic3/00101768_0.pdf>.*

Translation of JP 2012043602 Sharp Mar. 2012.*
OSRAM datasheet—Silicon NPN Phototransistor (p. 1) Jan. 2014.*
English language Abstract of EP 0563 696 A2.
International Search Report mailed on Jul. 4, 2014.
International Preliminary Report on Patentability (IPRP) mailed on Mar. 18, 2015.
Search Report issued by the Italian Patent and Trademark Office on Jul. 1, 2013 in the Italian Application No. VI2012A000298.
Written Opinion issued by the Italian Patent and Trademark Office on Jul. 10, 2013 in the Italian Application No. VI2012A000298.

* cited by examiner

LIGHTING APPARATUS WITH BRIGHTNESS SELF-ADJUSTMENT AND SELF-ADJUSTING METHOD THEREOF

The present invention generally relates to a lighting fixture with a brightness control and to a method thereof.

More particularly, the invention relates to a lighting apparatus equipped with electronic ballast having a brightness control ("auto-dimmer") which is based on a self-calibration or self-adjustment algorithm for controlling a brightness reference value ("set-point").

Lighting apparatus with automatic brightness adjustment include a light source (fluorescent tube, LED light source, etc.), an electronic ballast with brightness control (a so-called "dimmable ballast"), a sensor for detecting the brightness reflected by lighted objects and a feedback electronic circuit, which controls the dimmable ballast by using the error signal resulting from the difference between the light detected by said sensor and a prefixed brightness set-point.

Light control systems having the technical features of the preamble of the appended claim 1 are also known, for example from US2010/045191A1, US2006/278808A1 and EP0563696A2.

The main drawback of said known lighting apparatus is constituted by difficulties in defining said brightness set-point.

According to other known technical solutions, the lighting apparatus is provided with an adjustable aperture placed in correspondence of the brightness sensor, however said solution is difficult to use and in any case the calibration phase is always extremely tricky to carry out.

Other lighting apparatus are provided with a remote control or a knob, in order to adjust the brightness, but even the above solution is not feasible especially when a large number of lighting fixtures is installed.

A main object of the present invention is therefore to obviate the drawbacks of the above mentioned prior art and, in particular, to provide a lighting apparatus with a brightness control, which allows to effectively perform a brightness self-adjustment ("auto-dimmer"), as well as to carry out a self-calibration of the brightness set-point.

Another object of the present invention is to provide a lighting appliance with a brightness control, which is able to regulate the emitted light on the basis of the environment light, while keeping constant the light in the environment.

Another object of the present invention is to provide a lighting appliance with a brightness control, which allows to automatically decrease the emitted light when natural light is spread in the environment, together with another advantage in saving electrical energy.

A further object of the invention is to provide a lighting appliance with a brightness control, which is easy and economical to manufacture, without the use of complex and/or expensive technologies, as well as to provide a brightness self-adjusting method thereof.

These and other objects are achieved by a method for self-adjusting the brightness of a lighting apparatus according to the appended claim 1.

Other technical characteristics of the above mentioned method, according to the present invention, are included in the dependent claims.

Advantageously, the lighting device according to the invention is equipped with electronic ballast having a brightness self-adjustment (auto-dimmer) and a self-calibration of the brightness set-point and also having:

an environment light sensor and a control circuit for automatically tuning the emitted light, which is capable of adjusting said emitted light in view of the environment light, while keeping constant the light inside the environment, so as to automatically decrease the emitted light when natural light is spread in the environment, thus achieving a considerable saving in electricity consumption;

a self-calibration system for controlling said light sensor, which is based on a self-adapting algorithm which is able to fit the brightness of the lighting appliance to the intensity of natural light in the environment.

Further objects and advantages of the present invention will become clear from the following description, which refers to a preferred, but not exclusive embodiment, of the lighting apparatus with brightness control according to the invention, and from the enclosed drawings, in which.

Figure 1:
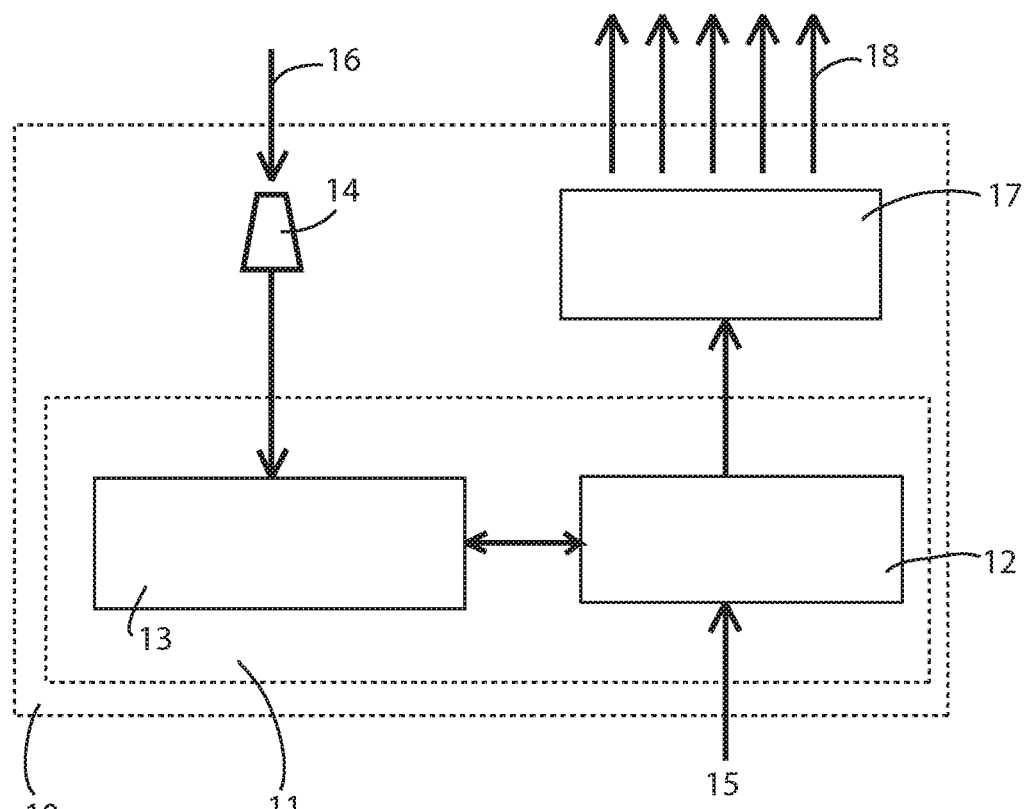
FIG. 1 shows a block diagram of the whole lighting apparatus with brightness control, according to the present invention.

Wth particular reference to the above mentioned FIG. 1, the lighting apparatus with brightness control 10 includes a power controller or regulator 11, which in turn includes a dimmable power supply 12, connected to the power supply 15 (230 Volt), and a meter circuit 13.

The power controller or regulator 11 controls a light or brightness sensor 14, which is able to measure light 16 scattered from a reference surface, such as the floor, in the environment, and the dimmable power supply 12 of the light source 17 (which is a LED-type or fluorescent light source) which emits light 18.

Once installed, the power controller or regulator 11 activates an automatic self-calibration of the light sensor 14, which allows the same sensor to adapt to the light which is spread in the environment where the light sensor 14 is placed.

The sensor 14 measures the light 16 reflected from the floor and from the other illuminated objects and the light adjustment occurs according to said measurement, i.e. by keeping constant the amount of reflected light 16, which is constituted by the sum of the light projected on the floor from the light source 17 of the lighting apparatus 10 and the natural light which is spread in the environment and which comes for example from windows and skylights.

It is obvious that keeping constant the sum of said reflected light 16 is equivalent to automatically decrease the light emitted from the light source 17 when the environment light increases.

The reflected light 16 is dependent on many physical and geometrical parameters, such as the reflection coefficient of the illuminated surface, its geometric shape, the distance from the lighting apparatus 10, the presence of various objects with features not homogeneous.

It is therefore practically impossible to make a default setting of the reflected light meter sensor 14, which is incorporated in the lighting apparatus 10; in fact, it is necessary to perform a new calibration for any different condition of installation.

Such a method for calibrating said devices is still performed by a manual adjustment of the reflected light sensor 14, which must be carried out by specialized personnel by acting on optical diaphragms or on suitable potentiometers and by measuring the light, on the same time, with a particular measuring apparatus.

Said calibration phase, however, has at least two drawbacks, both because it is a burdensome procedure and not easy to implement and because just a small variation in the environment geometric configuration is able to drastically change the calibration; for example, if after doing the calibration with a brown table, the brown table is replaced with a white table, the calibration is so changed that the lighting apparatus does not produce light nearly more, since it considers (according to the old calibration phase) that a great supply of external light is provided (due to the large increase in the reflection coefficient of the table whose color, from dark, it became bright).

The lighting apparatus 10 according to the invention has a continuous self-tuning or self-adjustment, which, therefore, is self-adaptive to changing environmental conditions where the light source 17 is installed.

The new function allows to make universal the lighting apparatus 10, thus allowing the use of a auto-dimmable light source 17, unlike the state of the art.

The power regulator 11, thanks to the adaptive calibration, measures, immediately after the installation, the light reflection conditions in the environment in which it is installed and it is able to estimate the correct mix of light emitted from the light source 17 and of natural light in the environment; said estimation becomes more accurate gradually as time goes on and automatically adapts to the geometric changes of the environment.

The process of brightness self-tuning takes place by measuring the light 16 which is reflected from the illuminated zone.

In particular, when no external light is spread in the environment (at night or when windows are closed) and the lighting apparatus 10 is on at full power, the light reflected from the floor 16 is exactly the light desired by the user; in fact, the lighting system is designed to provide the proper environment luminance in the absence of natural light coming from the outside.

Thus, the reference condition for carrying out the calibration is exactly the condition corresponding to the absence of natural light and with the lighting apparatus 10 which operates at full power.

According to the present invention, as soon as the lighting apparatus 10 is installed and turned on, the light source 17 is driven at maximum light intensity.

After an initial light stabilization time T1 (about 1 minute in case the light source 17 is a LED and about 10 minutes in case the light source 17 is a fluorescent light source), the device 11 measures the light reflected from the floor 16 by means of the built-in brightness sensor 14 and gives said measured brightness value to the prefixed brightness set-point.

In case the above condition occurs when no natural light is spread in the environment, the set-point is already the correct one and the power regulator 11 has already identified by itself and with a single reading the right calibration value.

Afterwards, the device 11 may adjust the light so as to maintain constant the reflected light 16; thus, if the natural light increases, the power is automatically decreased, so as to deduct the artificial light provided by the source light 17 for a quantity equal to the natural light that is spread in the environment.

The adjustment takes place up to a minimum possible value of brightness.

If, on the contrary, when, after T1, the first measure of brightness is performed and the first set-point is assigned and natural light is spread in the environment, the device 11 always assigns the detected set-point, but a wrong positioning of said value is provided.

In this situation, only a further increase of natural light can bring down the brightness of the light source 17, which will continue to emit the maximum brightness at a maximum power for all the values of natural light less than or equal to the value of natural light which has been detected at time T1.

Moreover, each operating period T2 (for example, T2=about 60 minutes), the device 11 makes a new set-point calibration.

In particular, in order to make the new calibration, the device 11 has the maximum power and detects the reflected light 16; if the detected value is less than the stored set-point value, the new set-point is considered as equal to the detected value, otherwise the old set-point is considered as the right set-point.

In fact, if a lower value of the old set-point is detected when maximum power is emitted by the light source 17, the amount of natural light is decreased with respect to the previous measurement or the reflection conditions are changed; in both cases, for obtaining a proper adjustment, it is necessary to use the new detected value, which comes closest to the ideal set-point and then the old value is replaced with the new value.

About once every hour (every time T2), the device 11 automatically performs the above procedure and calibration is achieved when re-calibration occurs with no natural light is spread in the environment.

The lighting apparatus 10 is able to self-adjust the brightness between one time of re-calibration and the next one according to the last prefixed set-point; therefore, when natural light is spread in the environment, the light power of the light source 17 decreases of a quantity, thus having low light working conditions.

At every time of re-calibration (every time T2) the power must be restored to the maximum value to allow a proper calibration; in any case, in order to hide the re-calibration phase for the user (during the which the brightness suddenly increases), the brightness 18 is slowly increased from a current value to a maximum value according to a linear ramp at constant slope and having a maximum period equal to T3 (little more than 1 minute), and the correct value of self-adjustment is restored by using a second linear ramp at constant slope and having a period T4, after having measured the brightness at full power.

Figure 2:
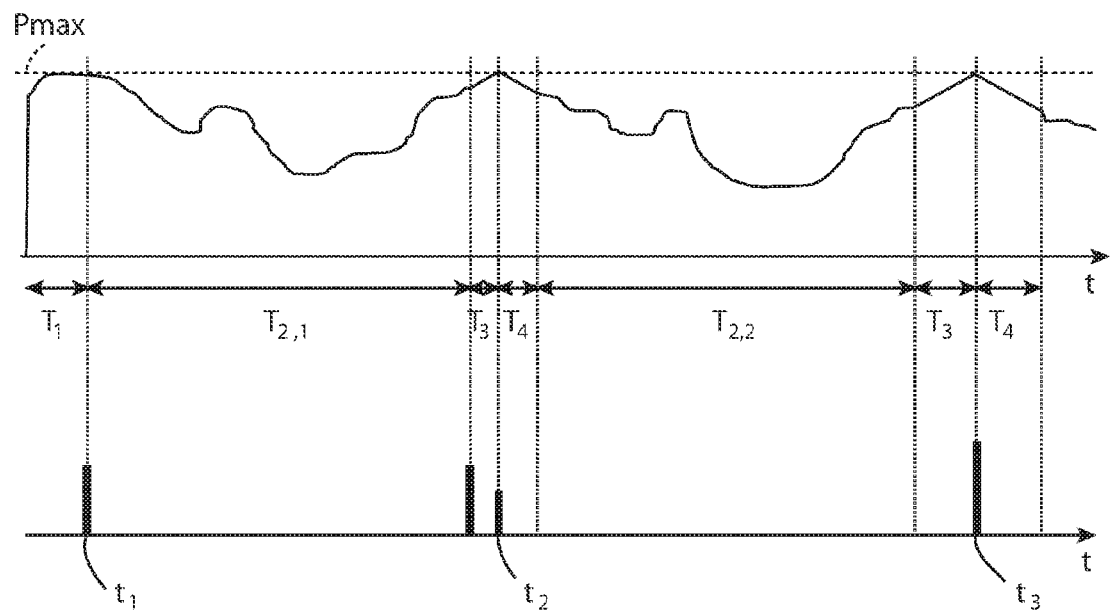
FIG. 2 shows a timing diagram showing the operation of the lighting apparatus according to the invention.

The diagram of the appended FIG. 2 shows the trend of the power of light emitted from the light source 17 and the measurements of the reflected light 16; times T1; T2,1; T2,2; T3; T4, the maximum power Pmax of the light source 17 and a series of re-calibrations carried out at times t1, t2, t3, in correspondence of respective set-point values SP1 (initial brightness), SP2 (new set-point measure, as the measurement of the reflected light 16 at time t2 is less than SP1) and SP3 (SP3=SP2, as the measure of the reflected light 16 at time t3 is greater than SP2) are shown; furthermore, time T1 is the initial delay which is needed to obtain the light stabilization, time T2,1 is the time during the which the lighting apparatus 10 operates with the brightness self-adjustment and with set-point SP1, time T2,2 is the time during the lighting apparatus 10 operates with the brightness self-adjustment and with set point SP2 and times T3 and T4 are times during which the brightness ramp are slow, at constant slope and respectively before and after the re-calibration phase.

When LED-type light sources 17 are used, typical times are T1=1 minute, T2,1=T2,2=1 hour, T3=T4≤80 sec.

The adaptive calibration algorithm, according to the present invention, also provides some other correction mechanisms which avoid particular conditions occurring during spurious steps.

If, for example, at a re-calibration time t1, t2, t3, a large and very dark object is placed under the sensor 14 of the reflected light 16, the new set-point value drops to a very low value, due to a wrong transient condition, and therefore the lighting apparatus 10 may operate, after the object has been removed, with a low emitted power even when, on the contrary, a full power is required to properly illuminate the environment.

To overcome the above drawback, after 5 subsequent calibrations (corresponding to a little more than 5 hours of uninterrupted operation) during which the set-point value is always higher than the minimum value, the new set-point SPN is calculated as $$SPN=SPN\text{-}1+(SPN\text{-}1-SPmin)/8,$$

so that, for each subsequent calibration, one eighth of the difference between the current value SPN-1 and the minimum value SPmin recorded in the previous 5 steps is added to the set-point; it is thus possible to have higher set-point values, thus exerting a correction that compensates for possible errors due to inefficiency.

A further correction provides that, when the lighting apparatus 10 continuously operates for more than 12 hours, the minimum value recorded in the last 12 hours is scheduled as the new set-point; in fact, in this case, it is very likely that night hours are spent, when the amount of natural light is negligible.

Figure 3:
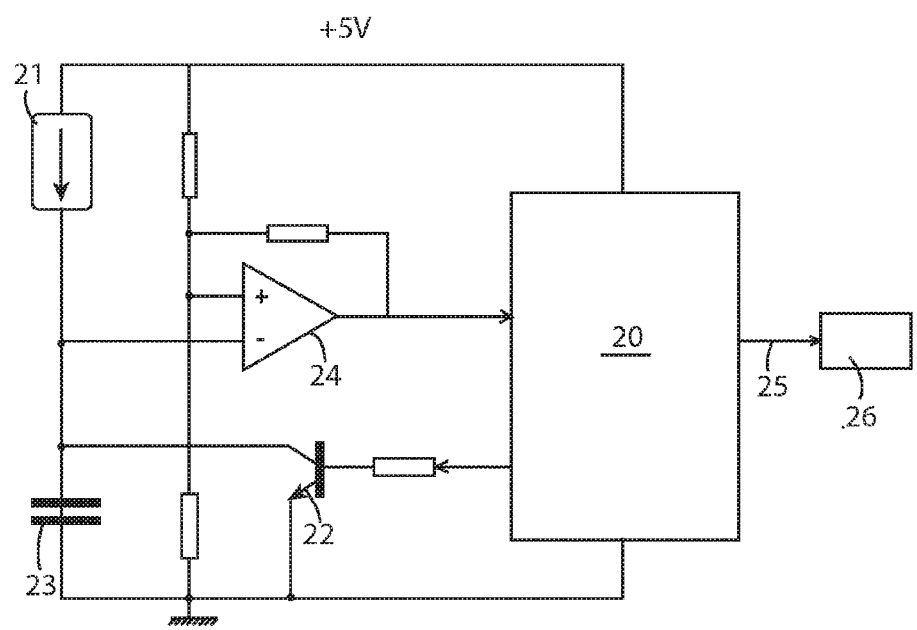
FIG. 3 shows a sketch of a preferred embodiment of an electronic circuit for measuring the light and for controlling the light brightness, which is used in the lighting apparatus according to the present invention.

According to a preferred embodiment of the invention, the meter device (calibrator) 13 is made by the electronic light measurement and self-adjustment circuit which is shown in the appended FIG. 3.

Said electronic circuit is made with very low cost elements and is based on an 8-bit microcontroller 20.

The reflected light 16 is measured by a phototransistor 21 (which constitutes the sensor 14) which includes a light correction lens according to the λ ("lambda") curve that is weighted on the human eye sensitivity.

The phototransistor 21 provides an electrical current which is proportional to the intensity of the reflected light 16 and the current intensity is variable from a few pA to a few μA.

The metering circuit must therefore be characterized by a large dynamic to automatically adapt it to the environmental conditions without incurring in saturation phenomena.

In order to achieve the above target without using expensive and complex multi-range amplifiers, the microcontroller 20 carries out a single ramp AD conversion.

In fact, according to a suitable time sequence which periodically repeats, the microcontroller 20 turns on the transistor 22, by resetting the capacitor 23, then turns off the transistor 22 and measures the time after which the output of the comparator 24 goes to 0; the above mentioned time is proportional to the intensity of the reflected light 16.

The measurement can take up to several seconds, when the light intensity is very low, but time is perfectly compatible with the above application.

The electronic circuit also provides for having a seeming photo-current, thus offering the advantage of a greater insensitivity to short disturbances due to the electrical noise and spurious light flashes.

The electronic circuit of the present invention is therefore able to perform the measurement of the reflected light with high accuracy, high dynamic and low costs.

The microcontroller 20 also implements a brightness self-adjustment algorithm and directly generates, at the output 25 and with a PWM technique, the command signal of the dimmer 26 of the power supply 12, which controls, in turn, the LED or fluorescent tube light source 17.

From the above description, the features of the lighting apparatus with brightness control, which is the object of the invention, are clear as well as the related advantages.

It is finally clear that many other variations may be made to the lighting apparatus with brightness control of the invention, without departing from the scope of the appended claims, as it is clear that in the practical implementation of the invention, materials, shapes and dimensions of the illustrated features may be any according to requirements and they can be replaced with other technically equivalent.

The invention claimed is:

1. A method for self-adjusting the brightness of a lighting apparatus, said lighting apparatus including:
   a) a regulator which includes a control circuit configured to automatically adjust the brightness emitted from at least one LED or fluorescent light source depending on the environment light, so as to automatically reduce the emitted brightness when the environment light increases, said regulator also including a power supply of said at least one LED or fluorescent light source which is dimmable by way of a dimmer driven by a command signal provided with a PWM technique at the output of a microcontroller; and
   b) a light sensor configured to measure the environment brightness which is reflected by at least one reference surface, said reflected environment brightness being equal to the sum of said emitted brightness and said environment light, said light sensor being calibrated by way of a brightness self-adjusting algorithm implemented by the microcontroller on the basis of the intensity of said environment light, so as to keep unchanged the amount of the reflected environment brightness,
      (i) the light sensor including a phototransistor which incorporates a light correction lens and which measures the reflected environment brightness by providing an electrical current which is proportional to the reflected environment brightness and
      (ii) the microcontroller being configured to perform a single linear ramp AD conversion of a signal provided at the output of a comparator, the microcontroller turning on and off, according to a periodic time sequence, a transistor by resetting a capacitor in order to measure a time interval after which the signal at the output of the comparator is equal to zero, the time interval being proportional to the reflected environment brightness;
   said self-adjusting method comprising:
      measuring, after a first settled time interval ($T_1$), the reflected environment brightness by way of the phototransistor when (a) there is no natural light in the environment or (b) one of said at least one LED or fluorescent light source operates at a maximum power;
      setting the value of the reflected environment brightness as measured by the phototransistor to a first predetermined value of brightness corresponding to an exact value of calibration of the phototransistor when the measuring of the reflected environment brightness is carried out in the absence of natural light in the environment;
      adjusting the emitted brightness to a level that keeps unchanged the reflected environment brightness, thus decreasing the power of the at least one LED or fluorescent light source by way of the dimmer when the natural light in the environment increases and vice-versa, up to a minimum value of the emitted brightness, wherein the first predetermined value of brightness corresponds to a first value of calibration when the measuring of the reflected environment brightness is carried out with natural light in the environment, the at least one of the LED or fluorescent light source thereby operating at the maximum power for all values of natural light which are less than or equal to the value of natural light detected after the first settled time interval ($T_1$);

calibrating a set of values of brightness during a second settled time interval ($T_2$) by setting the maximum power of said at least one of the LED or fluorescent light source and by measuring the reflected environment brightness;

setting up the calibrated set of values of brightness to a measured value of the reflected environment brightness if the measured value is less than the first value of calibration and to the first value of calibration if the measured value is greater than the first value of calibration;

said lighting apparatus restoring the maximum power to at least one of the LED or fluorescent light source every time a further calibrating of the values of brightness is carried out and therefore every time the second settled time interval ($T_2$) is elapsed, so that, for each calibrating step, the emitted brightness is increased from a current value to a maximum value according to the single linear ramp Analog Digital conversion performed by the microcontroller, with a constant slope and for a predetermined time period ($T_3$), and then is again decreased from the maximum value to the current value according to the single linear ramp Analog Digital conversion performed by the microcontroller, with a constant slope and for the predetermined time period ($T_3$);

the lighting apparatus automatically adjusting the value of brightness on the basis of the last value of calibration defined between two subsequent times of further calibration, wherein, after at least five consecutive calibrating steps during which the measured value is greater than the first value of calibration, the exact value of calibration is calculated, for each further calibrating step, by adding to the first value of calibration, one eighth of the difference between the first value of calibration and a minimum value of calibration logged in at least five previous calibrating steps, wherein the minimum value of calibration is considered as the exact value of calibration if the at least one of said LED or fluorescent light source of the lighting apparatus continuously operates for more than twelve hours.

2. The method according to claim 1, wherein the at least one reference surface comprises a floor.

3. A method for self-adjusting the brightness of a lighting apparatus said lighting apparatus including:

a) a regulator which includes a control circuit configured to automatically adjust the brightness emitted from at least one LED or fluorescent light source depending on the environment light, so as to automatically reduce said emitted brightness when the environment light increases, said regulator also including a power supply of said at least one LED or fluorescent light source which is dimmable by way of a dimmer driven by a command signal provided with a Pulse Width Modulation technique at the output of a microcontroller, and b) a light sensor configured to measure the environment brightness which is reflected by at least one reference surface, said reflected environment brightness being equal to the sum of said emitted brightness and said environment light, said light sensor being calibrated by way of a brightness self-adjusting algorithm implemented by said microcontroller on the basis of the intensity of said environment light, so as to keep unchanged the amount of said reflected environment brightness, wherein said light sensor comprises a phototransistor which incorporates a light correction lens and which measures said reflected environment brightness by providing an electrical current which is proportional to said reflected environment brightness and wherein said microcontroller is configured to perform a single linear ramp Analog Digital conversion of a signal provided at the output of a comparator and said microcontroller also turns on and off, according to a periodic time sequence, a transistor by resetting a capacitor, in order to measure a time interval after which said signal at the output of said comparator is equal to zero, said time interval being proportional to said reflected environment brightness, said self-adjusting method comprising:

measuring, after a first settled time interval ($T_1$), said reflected environment brightness by way of said phototransistor when (a) there is no natural light in the environment or (b) one of said at least one LED or fluorescent light source operates at a maximum power, setting up the value of said reflected environment brightness which is measured by said phototransistor to a first predetermined value of brightness corresponding to an exact value of calibration of said phototransistor when said measuring of said reflected environment brightness is carried out when there is no natural light in the environment, adjusting said emitted brightness so as to keep unchanged said reflected environment brightness, thus decreasing the power of said at least one LED or fluorescent light source by way of said dimmer when the natural light in the environment increases and vice-versa, up to a minimum value of said emitted brightness, wherein said first predetermined value of brightness corresponds to a first value of calibration when said measuring of said reflected environment brightness is carried out with natural light in the environment, said at least one of the LED or fluorescent light source thereby operating at said maximum power for all values of natural light which are less than or equal to the value of natural light detected after said first settled time interval ($T_1$), calibrating a set of values of brightness during a second settled time interval ($T_2$) by setting said maximum power of said at least one of the LED or fluorescent light source and by measuring said reflected environment brightness, and setting up said calibrated set of values of brightness to a measured value of said reflected environment brightness if said measured value is less than said first value of calibration and to said first value of calibration if said measured value is greater than said first value of calibration, wherein said lighting apparatus restores said maximum power to said at least one of the LED or fluorescent light source every time a further calibrating of said values of brightness is carried out and therefore every time said second settled time interval ($T_2$) is elapsed, so that, for each calibrating step, said emitted brightness is increased from a current value to a maximum value according to said single linear ramp Analog Digital conversion, performed by said microcontroller, with a constant slope and for a predetermined time period ($T_3$), and then is again decreased from said maximum value to said current value according to said single linear ramp ANALOG DIGITAL conversion, performed by said microcontroller, with a constant slope and for said predetermined time period ($T_3$), and wherein after at least five consecutive calibrating steps during which said measured value is greater than said first value of calibration, said exact value of calibration is calculated, for each further calibrating step, by adding to said first value of calibration, one eighth of the difference between said first value of calibration and a minimum value of calibration logged in at least five previous calibrating steps.

4. The method according to claim 3, wherein said minimum value of calibration is considered as said exact value of calibration if said at least one of said LED or fluorescent light source of the lighting apparatus continuously operates for more than twelve hours.

5. The method according to claim 3, wherein the at least one reference surface comprises a floor.

6. A method for self-adjusting the brightness of a lighting apparatus, said lighting apparatus including:
  a) a regulator which includes a control circuit configured to automatically adjust the brightness emitted from at least one LED or fluorescent light source depending on the environment light, so as to automatically reduce said emitted brightness when the environment light increases, said regulator also including a power supply of said at least one LED or fluorescent light source which is dimmable by way of a dimmer driven by a command signal provided with a PWM technique at the output of a microcontroller, and
  b) a light sensor configured to measure the environment brightness which is reflected by at least one reference surface, said reflected environment brightness being equal to the sum of said emitted brightness and said environment light, said light sensor being calibrated by way of a brightness self-adjusting algorithm implemented by said microcontroller on the basis of the intensity of said environment light, so as to keep unchanged the amount of said reflected environment brightness,
  wherein said light sensor comprises a phototransistor which incorporates a light correction lens and which measures said reflected environment brightness by providing an electrical current which is proportional to said reflected environment brightness and
  wherein said microcontroller is configured to perform a single linear ramp ANALOG DIGITAL conversion of a signal provided at the output of a comparator and said microcontroller also turns on and off, according to a periodic time sequence, a transistor by resetting a capacitor, in order to measure a time interval after which said signal at the output of said comparator is equal to zero, said time interval being proportional to said reflected environment brightness,
  said self-adjusting method comprising:
    measuring, after a first settled time interval ($T_1$), said reflected environment brightness by way of said phototransistor when (a) there is no natural light in the environment or (b) one of said at least one LED or fluorescent light source operates at a maximum power,
    setting up the value of said reflected environment brightness which is measured by said phototransistor to a first predetermined value of brightness corresponding to an exact value of calibration of said phototransistor when said measuring of said reflected environment brightness is carried out when there is no natural light in the environment,
    adjusting said emitted brightness so as to keep unchanged said reflected environment brightness, thus decreasing the power of said at least one LED or fluorescent light source by way of said dimmer when the natural light in the environment increases and vice-versa, up to a minimum value of said emitted brightness, wherein said first predetermined value of brightness corresponds to a first value of calibration when said measuring of said reflected environment brightness is carried out with natural light in the environment, said at least one of the LED or fluorescent light source thereby operating at said maximum power for all values of natural light which are less than or equal to the value of natural light detected after said first settled time interval ($T_1$),
    calibrating a set of values of brightness during a second settled time interval ($T_2$) by setting said maximum power of said at least one of the LED or fluorescent light source and by measuring said reflected environment brightness, and
    setting up said calibrated set of values of brightness to a measured value of said reflected environment brightness if said measured value is less than said first value of calibration and to said first value of calibration if said measured value is greater than said first value of calibration,
  wherein said lighting apparatus restores said maximum power to said at least one of the LED or fluorescent light source every time a further calibrating of said values of brightness is carried out and therefore every time said second settled time interval ($T_2$) is elapsed, so that, for each calibrating step, said emitted brightness is increased from a current value to a maximum value according to said single linear ramp Analog Digital conversion, performed by said microcontroller, with a constant slope and for a predetermined time period ($T_3$), and then is again decreased from said maximum value to said current value according to said single linear ramp Analog Digital conversion, performed by said microcontroller, with a constant slope and for said predetermined time period ($T_3$), wherein after at least five consecutive calibrating steps during which said measured value is greater than said first value of calibration, said exact value of calibration is calculated, for each further calibrating step, by adding to said first value of calibration one eighth of the difference between said first value of calibration and a minimum value of calibration logged in at least five previous calibrating steps, and further wherein said lighting apparatus automatically adjusts said value of brightness on the basis of the last value of calibration defined between two subsequent times of further calibration.

* * * * *